United States Patent [19]

Yuzawa

[11] Patent Number: 5,386,587
[45] Date of Patent: Jan. 31, 1995

[54] SATELLITE BROADCASTING RECEIVING SYSTEM WITH RECEPTION LEVEL INDICATOR USING CONTROL SIGNAL FROM RECEIVER

[75] Inventor: Keji Yuzawa, Tokyo, Japan

[73] Assignee: Sony Corporation, Tokyo, Japan

[21] Appl. No.: 988,484

[22] Filed: Dec. 10, 1992

[30] Foreign Application Priority Data

Dec. 20, 1991 [JP] Japan .................. 3-354501

[51] Int. Cl.⁶ .............................. H04B 1/16
[52] U.S. Cl. .................. 455/3.2; 455/226.4; 455/277.1; 455/282
[58] Field of Search ............. 455/3.2, 131, 277.1, 455/280, 281, 282, 289, 226.1, 226.2, 226.4

[56] References Cited

U.S. PATENT DOCUMENTS 4,509,198  4/1985  Nagatomi .

FOREIGN PATENT DOCUMENTS

| 56-068041 | 6/1981 | Japan . | |
|---|---|---|---|
| 59-186430 | 10/1984 | Japan . | |
| 60-119 | 1/1985 | Japan | 455/3.2 |
| 63-245132 | 10/1988 | Japan | 455/3.2 |
| 3-58521 | 3/1991 | Japan | 455/3.2 |
| 9106159 | 5/1991 | WIPO . | |

*Primary Examiner*—Edward F. Urban
*Assistant Examiner*—Chi H. Pham
*Attorney, Agent, or Firm*—Jay H. Maioli

[57] ABSTRACT

A satellite broadcasting reception system has a satellite antenna for receiving electromagnetic waves and a signal cable for transmitting signals produced upon reception of the electromagnetic waves by the satellite antenna. A receiver receives the signals transmitted over the signal cable, and a reception level indicator is connected to the signal cable for indicating a reception level of the electromagnetic waves on the basis of a control signal transmitted from the receiver over the signal cable.

7 Claims, 4 Drawing Sheets

SATELLITE BROADCASTING RECEIVING SYSTEM WITH RECEPTION LEVEL INDICATOR USING CONTROL SIGNAL FROM RECEIVER

FIELD OF THE INVENTION

This invention relates to a satellite broadcasting reception system for receiving satellite broadcasting, such as BS or CS broadcasting.

DESCRIPTION OF THE PRIOR ART

In the near future, communication satellite (CS) broadcasting is scheduled to be added in satellite broadcasting to current BS broadcasting (broadcasting by broadcasting satellite) and the number of stations for CS broadcasting is likely to be increased by plural communication satellites. Since the broadcasting satellites or communication satellites are different in height and position, it is not possible for a sole satellite antenna to receive all of the electromagnetic waves, so that it is necessary to use plural satellite antennas. In installing these plural antennas, it is important to orient the satellite antennas correctly in the direction of the broadcasting or communication satellites.

In a BS receiver, for example, the reception level is calculated by utilizing the fact that the automatic gain control (AGC) voltage is changed with fluctuations in the input level of the BS tuner, and the calculated reception level value is displayed on a screen of a TV receiver connected to or united with a main body of the receiver for adjusting the direction or the angle of elevation of the satellite antenna.

The above-described AGC voltage is hereinafter explained.

The electromagnetic waves of channels of the received satellite broadcasting are not necessarily received with the same intensity by the receiver and the waves fluctuate continually, that is, become stronger or weaker depending on weather conditions of transmission routes. Consequently, image contrast is changed depending on the intensities of the electromagnetic waves to render it necessary to perform contrast adjustment from time to time. For avoiding such necessity, an intermediate frequency amplification circuit is controlled ed by AGC to raise or lower the amplification factor when the electromagnetic waves are weak or strong, respectively. That is, if the electromagnetic waves are strong, the AGC voltage is raised to lower the amplification factor of the intermediate frequency amplification circuit, whereas if the electromagnetic waves are weak, the AGC voltage is lowered to raise the amplification factor of the intermediate frequency amplification circuit.

Meanwhile, if the satellite antenna is spaced apart from a receiver or a TV receiver, it is difficult or inconvenient for an operator engaged in an antenna adjustment operation to directly view a reception level displayed on a main body of a receiver or a TV receiver connected to or united with the receiver by taking advantage of the AGC voltage of the receiver. It is therefore necessary for an operator to adjust the direction or angle of elevation of the satellite antenna at the satellite antenna and another operator to read the reception level at a position where the reception level is displayed and for these operators to exchange the information in installing the satellite antenna. If a sole operator is to perform these two operations, the operation would be more painful to the operator. It has therefore been desired to be able to check the reception level display in the neighborhood of the satellite antenna; however, a suitable method therefor has not been found to date.

OBJECT AND SUMMARY OF THE INVENTION

It is an object of the present invention to provide a satellite broadcasting reception system whereby the reception level of the electromagnetic waves of satellite broadcasting may be displayed correctly in the vicinity of the satellite antenna without raising costs.

In accordance with the present invention, there is provided a satellite broadcasting reception system comprising a satellite antenna for receiving electric waves for satellite broadcasting, a signal cable for transmitting broadcast signals produced upon reception of the electric waves for satellite broadcasting by said satellite antenna, a receiver for receiving the broadcast signals transmitted over said signal cable, and a reception level indicator provided on said signal cable interconnecting said satellite antenna and said receiver for indicating a reception level of the electromagnetic waves for satellite broadcasting on the basis of a control signal transmitted from said receiver over said signal cable.

In an embodiment of the present invention, the control signal from the receiver to the reception level indicator is a signal modulating a high-frequency signal as a carrier.

In an embodiment of the present invention, the control signal from the receiver to the reception level indicator is a signal modulating voice sampling clocks as a carrier.

In an embodiment of the present invention, the reception level indicator is provided in the vicinity of the satellite antenna in the signal cable interconnecting the satellite antenna and the receiver.

In an embodiment of the present invention, the receiver is not in need of an oscillator for producing the carrier wave, and electromagnetic waves for satellite broadcasting received by the satellite antenna may be electromagnetic waves for satellite broadcasting concerning broadcasting by broadcasting or communication satellite.

In accordance with the present invention, there is also provided a satellite broadcasting reception system comprising a changeover distributor for switching among plural broadcasting signals obtained from plural satellite broadcasting electromagnetic waves received from plural satellite antennas, said system being adapted for selectively transmitting plural broadcasting signals over plural signal cables, said system further comprising a reception level indicator for extracting a reception level signal from a control signal made up of a changeover control signal controlling the switching of said changeover distributor and reception level signals indicating the reception levels of said receivers and for indicating the reception levels.

In one embodiment of the present invention, the satellite antennas receive the electromagnetic waves for satellite broadcasting by broadcasting satellite or communication satellite.

In one aspect of the present invention, the electromagnetic waves for satellite broadcasting received by the satellite antenna are transmitted to the receiver as broadcasting signals over the signal cable and the receiver supplies control signals over the signal cable interconnecting the satellite antenna and the receiver responsive to the electromagnetic waves for satellite broadcasting, so that the reception level of the electromagnetic waves for satellite broadcasting may be accurately displayed by providing the reception level indicator in the vicinity of the satellite antenna on the signal cable. By transmitting the control signal modulating the high-frequency signals as carrier waves from the receiver, the reception level may be indicated on the reception level indicator without being affected by the low frequency impedance of a power source circuit. By transmitting the controlling signal modulating the voice sampling clocks from the receiver as the carrier wave, the reception level may be indicated on the reception level indicator without being affected by the low frequency impedance of the power source circuit.

In another aspect of the present invention, the control signal made up of the changeover control signal and the reception signals is supplied to a changeover distributor adapted for switching plural broadcasting signals obtained from plural electromagnetic waves for satellite broadcasting received by plural satellite antennas and the reception level signal is derived from the control signal by the reception level indicator and displayed, so that the reception level of the electromagnetic waves for satellite broadcasting may be accurately displayed without raising costs by providing the changeover distributor and the reception level indicator in the vicinity of the satellite antenna.

Consequently, in the satellite broadcasting reception system of the present invention, the satellite antenna receives the electromagnetic waves for satellite broadcasting and transmits the received electromagnetic waves to the receiver which then transmits the control signal to the reception level indicator provided on the signal cable interconnecting the satellite antenna and the receiver responsive to the electromagnetic waves for satellite broadcasting, whereby the reception level of the electromagnetic waves for satellite broadcasting may be displayed on the reception level indicator and hence the satellite antenna may be adjusted while the operator views the displayed reception level. The result is that the satellite antenna may be installed easily.

Since the control signal is the signal modulating the voice sampling clocks, which are high frequency signals, as the carrier wave, there is no necessity of providing an oscillator for the career waves to achieve reduction of costs.

Besides, in the satellite broadcasting reception system of the present invention, the control signal supplied from the receiver over the signal cable to the changeover distributor is used as a changeover control signal for selecting the broadcasting signals from the control signal supplied from the receiver to the changeover distributor and as the reception level signal for displaying the reception level signals for the broadcasting signals. Thus the satellite antenna may be adjusted by viewing the displayed reception level if the changeover distributor and the satellite antenna are provided in the vicinity of the satellite antenna.

DETAILED DESCRIPTION OF THE PREFERRED EMBODIMENTS

Figure 1:
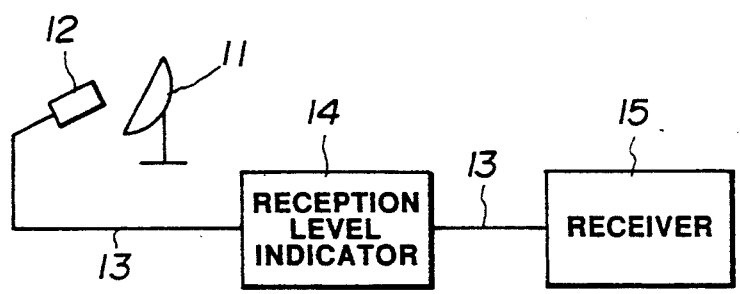
FIG. 1 is a block circuit diagram showing an embodiment of a satellite broadcasting reception system according to the present invention.

Referring to the drawings, certain preferred embodiments of the satellite broadcasting reception system according to the present invention will be explained in detail.

In FIG. 1, an embodiment of the satellite broadcasting reception system according to the present invention is illustrated in a block circuit diagram.

The embodiment shown in FIG. 1 comprises a satellite antenna 11 for receiving electromagnetic waves of satellite broadcasting, a BS converter 12 for capturing the electromagnetic waves received by the satellite antenna 11, a signal cable 13 for transmitting broadcast signals obtained by capturing the satellite broadcasting electromagnetic waves by the BS converter 12, a receiver 15 for receiving broadcast signals transmitted over the signal cable 13 and a reception level indicator 14 provided in the signal cable 13 in the vicinity of the satellite antenna 11 for displaying the reception level of the electromagnetic waves based on control signals supplied from receiver 15 over signal cable 13.

The BS converter 12 converts satellite broadcasting electromagnetic waves in the 12 GHz band received by satellite antenna 11 into intermediate frequency (IF) signals which are broadcasting signals in the 1 GHz range. These IF signals are transmitted over signal cable 13 so as to be supplied to receiver 15.

Figure 2:
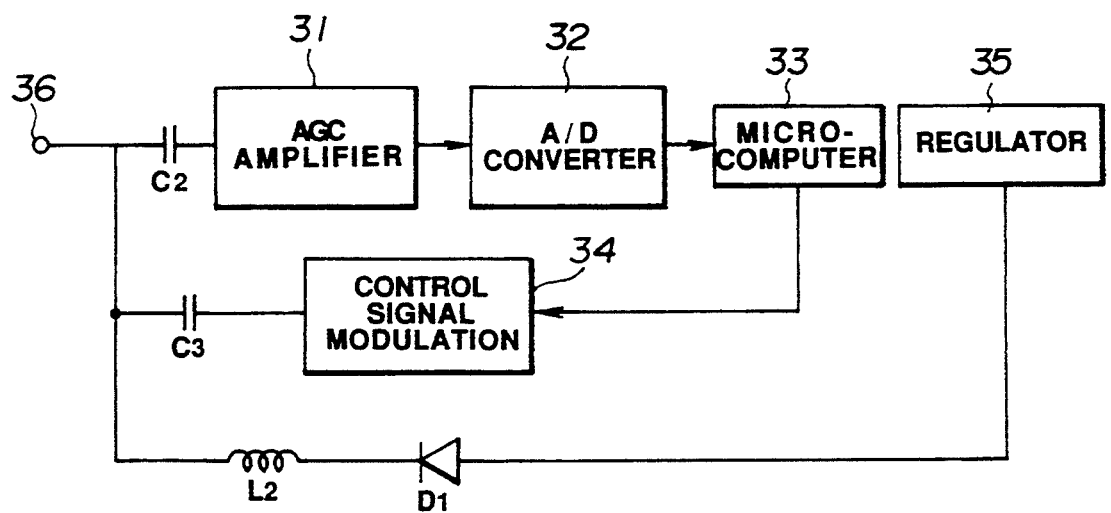
FIG. 2 is a block circuit diagram showing the portions of the embodiment of the satellite broadcasting reception system shown in FIG. 1 generating the receiver control signals.

The arrangement and the operation of a portion of the receiver 15 generating the control signals, or a control signal generating portion, is explained by referring to FIG. 2.

In FIG. 2, the control signal generating portion in the receiver 15 is shown by a block circuit diagram.

Referring to FIG. 2, broadcast signals from converter 12 are supplied to an AGC amplifier 31 via a capacitor $C_2$ blocking a d.c. voltage of +15 V used as a constant voltage power source. Part of the AGC voltage from AGC amplifier 31 is supplied via A/D converter 32 to a micro-computer 33 which generates an envelope which is supplied to a control signal modulating circuit 34 for modulating the carrier wave. The control signals outputted from the control signal modulating circuit 34 are supplied from terminal 36 to signal cable 13 after their d.c. components are blocked by a capacitor $C_3$. A d.c. voltage of +15 V is supplied by a regulator 35 via an inverse current inhibiting diode $D_1$ and an inductor $L_2$ for blocking high frequency to reception level indicator 14 and BS converter 12.

The operation of the above-described control signal generating portion is hereinafter explained.

The broadcasting signals supplied from BS converter 12 are supplied to AGC amplifier 31 via capacitor $C_2$ blocking the d.c. component of +15 V. The AGC amplifier 31 controls video signals from an image IF amplification circuit, not shown, by AGC for lowering or raising the amplification factor of the image IF amplification circuit if the image signal level is high or low, respectively. The AGC amplifier 31 generates the AGC voltage conforming to the image signal level, that is the reception level of the electromagnetic waves of satellite broadcasting. The generated AGC voltage is converted by A/D converter 32 into digital signals which are supplied to micro-computer 33. The micro-computer 33 encodes the AGC voltage to generate an envelope of the control signals. This envelope is supplied to control signal modulation circuit 34 for modulating the carrier wave (tens of kHz). The modulated carrier wave is supplied via capacitor $C_3$ blocking the direct current of +15 V to reception level indicator 14 via terminal 36. The constant voltage of +15 V is supplied from regulator 35 via inverse current blocking diode $D_1$, high frequency blocking inductor $L_2$ and terminal 36 to reception level indicator 14 and BS converter 12.

The envelope of the control signals taken out by micro-computer 33 is supplied to control signal modulation circuit 34 which modulates the carrier wave on the basis of the envelope of the control signals for conversion into a format of the control signals. Since the signal superimposed on the control signals is derived from the constant voltage source of d.c. 15 V, the carrier wave would be affected by the low-frequency impedance of the constant voltage source if the carrier wave is of a lower frequency. It is therefore desirable for the carrier wave to be of a higher frequency. Since a large quantity of ICs demodulating the carrier wave in the vicinity of 40 kHz is marketed for IR remote control reception, the high frequency signals in the vicinity of 40 kHz are suited as carrier waves. In view thereof, voice signals are sampled at 32 kHz or 48 kHz and a reproducing circuit for the corresponding sampling clocks is provided within receiver 15. If these reproducing sampling clocks are used as the carrier wave, there is no necessity of providing an oscillator for generating the carrier wave. The receiver 15 employing the playback sampling clocks as the carrier wave is explained by referring to FIG. 4.

Figure 4:
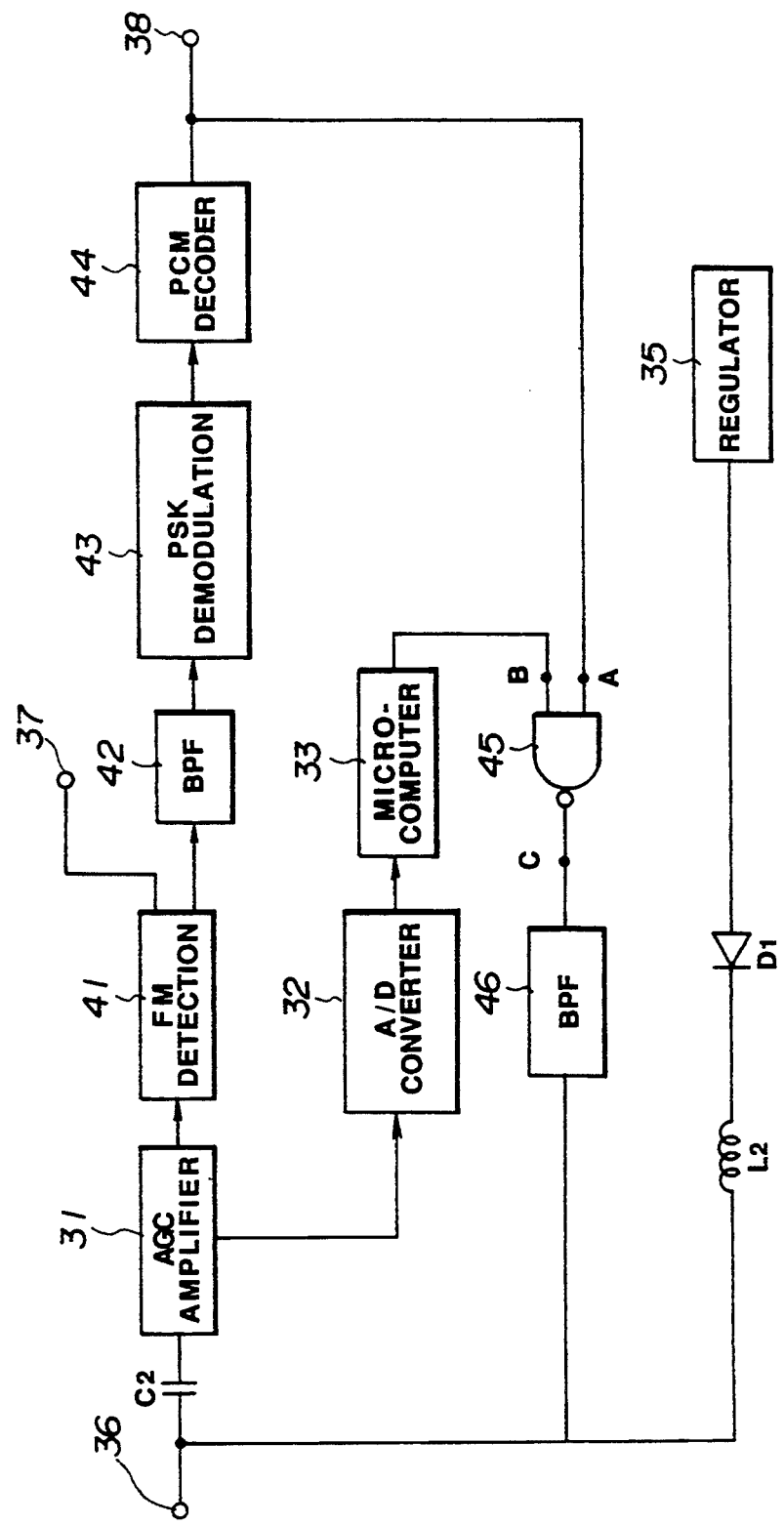
FIG. 4 is a block circuit diagram showing the portion of the embodiment of FIG. 1 generating control signals with voice sampling clocks as a carrier wave.

In FIG. 4, part of the AGC voltage from AGC amplifier 31 is supplied via A/D converter 32 to micro-computer 33 which generates the above-mentioned envelope. The AGC amplifier 31 also supplies the AGC voltage to an FM detection circuit 41. The detection signals from the FM detection circuit 41 are also supplied to a band-pass filter (BPF) 42 which extracts only the voice carrier from the detection signals. The extracted voice carrier is supplied to a PSK demodulating circuit 43 for phase shift keying (PSK). A bit stream from PSK demodulating circuit 43 is supplied to a PCM decoder 44 for decoding. The PCM decoder 44 generates not only digital voice signals, but voice sampling clocks as well. The digital voice signals are outputted at an output terminal 38. The voice sampling clocks as well as the envelope generated by micro-computer 33 are supplied to an inverting AND circuit or NAND gate 45. An output from NAND gate 45 is bandwidth-limited by BPF 46 so as to be supplied via terminal 36 and cable 13 to reception level indicator 14. Signals detected by FM detection circuit 41 are also supplied via output terminal 37 to a video signal processing circuit made up of a deemphasis circuit, an energy diffusion signal eliminator and an image amplification circuit, not shown.

The operation of the above-described receiver 15 is reproducing voice sampling clocks for generating the control signals is hereinafter explained.

The AGC voltage from AGC amplifier 31 is detected by FM detection circuit 41 and only the voice carrier of 5.73 MHz is extracted by BPF 42. The extracted voice carrier is demodulated by PSK demodulating circuit 43 to form a bit stream of 2.048 MHz. This bit stream is decoded by PCM decoding circuit 44 into digital voice signals. At this time, the sampling clocks of 32 MHz or 48 MHz are reproduced. These sampling clocks and the envelope from micro-computer 33 are inputted at NAND circuit 45 for amplitude modulation. The amplitude-modulated signals are passed through BPF 46 and freed of wasteful direct current and high harmonics so as to be transmitted via terminal 36 to signal cable 13 and to reception level indicator 14.

Figure 5:
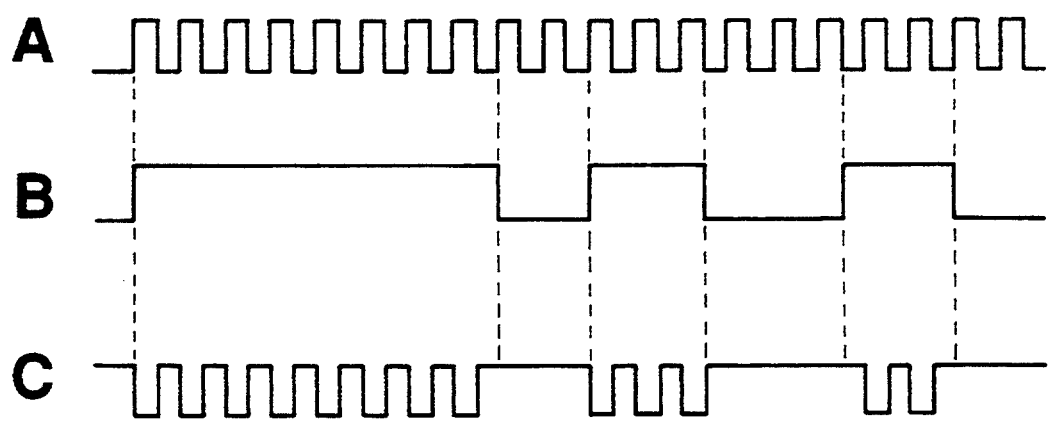
FIG. 5 is a signal waveform diagram showing an input and an output of an inverting AND circuit in the embodiment shown in FIG. 4.

FIG. 5 shows the waveform of an input to and an output from NAND gate 45 of the reception circuit, 15.

FIG. 5A shows the waveform of the sampling clocks from PCM decoder 44 and FIG. 5B the waveform of the envelope from micro-computer 33. These sampling clocks and the envelope are inputted to NAND gate 45 from which the inverted logical product is outputted with a waveform shown in FIG. 5C. The output of NAND gate 45 shown in FIG. 5C is equivalent to amplitude modulation of the sampling clocks shown in FIG. 5A by the envelope shown in FIG. 5B so that the control signals are format-converted into reception level indicating signals.

Figure 3:
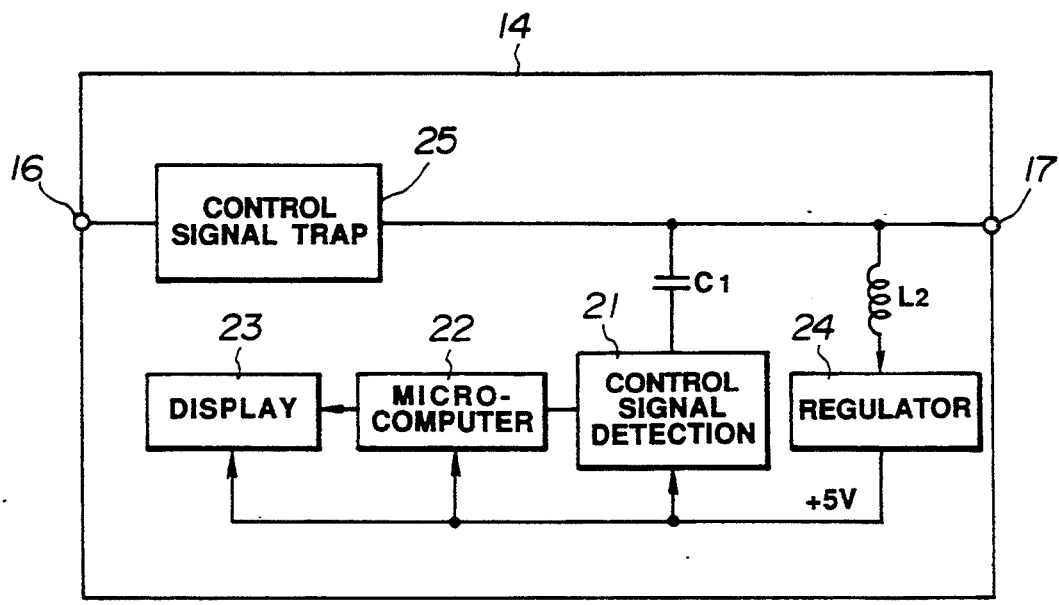
FIG. 3 is a block circuit diagram showing a concrete arrangement of a reception level indicator of the embodiment shown in FIG. 1.

The arrangement and operation of the reception level indicator 14 shown in FIG. 1 are explained by referring to FIG. 3.

In FIG. 3, the reception level indicator 14 comprises a control signal detection circuit 21 for detecting the carrier of the control signals, from which the d.c. components are blocked by capacitor $C_1$, to produce an envelope, a micro-computer 22 for decoding the envelope from the control signal detection circuit 21 for producing the reception level, an indicator 23 for lighting a two-digit seven-segment LED in accordance with the reception level from micro-computer 22, a regulator 24 for supplying a power source voltage to micro-computer 22 and to display unit 23, and a control signal trap circuit 26 for preventing jamming of the control signals in BS converter 12.

The operation of the above-described reception level indicator is explained.

The superposed signals supplied from receiver 15 are freed of the d.c. +15 V for constant voltage source by capacitor $C_1$ to form the control signals which are supplied to control signal detection circuit 21, The control signal detection circuit 21 detects the carrier of the control signals to produce an envelope which is supplied to micro-computer 22. The micro-computer decodes the envelope to produce a reception level. The display unit 323 illuminates the two-digit seven-segment LED in accordance with the reception level to indicate the reception level. The d.c. constant voltage from the constant voltage source is supplied to regulator 24 via inductor $L_1$. The regulator 24 regulates the voltage of the d.c. 15 V for the constant voltage source to +5 V to supply the constant voltage control signal detection circuit 21, micro-computer 22 and to display unit 23. In the satellite broadcasting reception system of the above-described embodiment, the AGC voltage of the receiver 15 which becomes maximum when the voltage of the broadcast signals outputted from BS converter 12 becomes maximum is converted into control signals which are converted into a format of the reception level signals for transmission to reception level indicator 14 for displaying the reception level in the reception level indicator 14. Since it suffices in this manner to adjust the direction and angle of elevation of the satellite antenna so that the reception level indicated on the reception level indicator becomes maximum, and the indicator 14 is installed in the vicinity of the satellite antenna, the satellite antenna may be installed while the operator views the displayed reception level.

Besides, the satellite broadcasting reception system of the present embodiment is not affected by the low-frequency impedance because the high frequency signals are used as a carrier of the control signals.

In addition, by employing the playback sampling clocks of the PCM decoding circuit 44 as the carrier for control signals, there is no necessity of providing an oscillator for generating the carrier signals.

It is to be noted that the present invention is not limited to the above-described embodiments of the satellite broadcasting system. In the case of a system employing plural satellite antennas in common, the signal to be superposed on the signal cable may be a control signal composed of the changeover control signal for changing over satellite broadcasting signal from a desired satellite antenna and the signal indicating the reception level, each having a different format. This modified embodiment is hereinafter explained by referring to FIG. 6.

Figure 6:
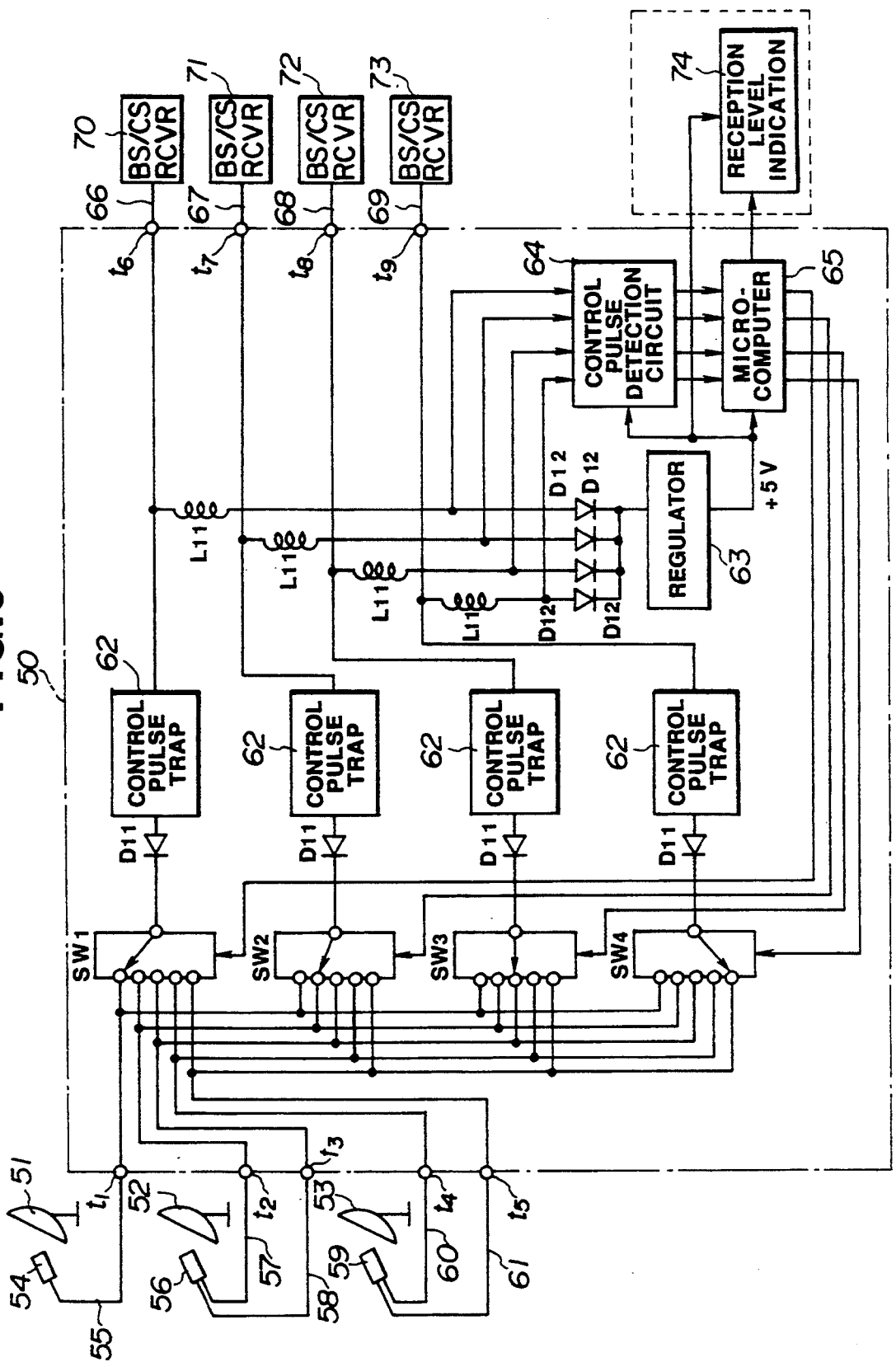
FIG. 6 is a block circuit diagram showing an arrangement of a modification of the satellite broadcasting reception system according to the present invention.

In FIG. 6, the modified embodiment of the satellite broadcasting reception system according to the present invention is illustrated in a block diagram.

In the modification of the satellite broadcasting system, shown in FIG. 6, a BS antenna 51, a $CS_1$ antenna 52 and a $CS_2$ antenna 53 are installed as satellite antennas. Of these, the BS antenna is used for receiving the BS broadcasting electromagnetic waves and the $CS_1$ and $CS_2$ antennas are used for receiving the $CS_1$ and $CS_2$ broadcasting electromagnetic waves, respectively.

The BS broadcasting waves received by BS antenna 51 are captured by BS converter 54. The BS converter 54 converts the frequency of the sole type of the BS broadcasting waves into a predetermined frequency for guiding the waves via signal cable 55 to a first input $t_1$ of a changeover distributor 50.

The $CS_1$ broadcasting waves, received by $CS_1$ antenna 52, are captured by $CS_1$ converter 56. The $CS_1$ broadcasting waves are composed of two linearly polarized waves perpendicular to each other. The $CS_1$ converter 56 converts the horizontal polarized broadcasting waves and the vertical polarized broadcasting waves into signals of a predetermined frequency for guiding the waves over two signal cables 60, 61 to fourth and fifth input terminals $t_4$, $t_5$ of the changeover distributor 50, respectively.

The changeover distributor 50 has four distribution output terminals $t_6$, $t_7$, $t_8$ and $t_9$ for separately outputting selected broadcasting signals from the above-mentioned five broadcasting signals. These distribution output terminals $t_6$, $t_7$, $t_8$ and $t_9$ are connected to signal cables 66, 67, 68 and 69, respectively, the other ends of which are connected to BS/CS receivers 70, 71, 72 and 73, respectively.

The BS/CS receivers 70, 71, 72 and 73 are adapted for issuing outputs of the converter power source over signal cables 66 to 69 when the power source is turned on by power switch, not shown. Besides, each BS/CS receiver 70 to 73 has a broadcasting selection switch for selecting one of five broadcasting types, namely the BS broadcasting, horizontal polarized wave broadcasting of $CS_1$, vertical polarized wave broadcasting of $CS_1$, horizontal polarized wave broadcasting of $CS_2$ and vertical polarized wave broadcasting of $CS_2$. The selection information by this broadcasting selection switch is converted by a pulse coding circuit, not shown, into control pulses which are outputted over signal cables 66 to 69 to the converter power source in superimposition.

First to fourth changeover switches $SW_1$, $SW_2$, $SW_3$, $SW_4$ are provided in the changeover distributor 50 in association with the distribution output terminals $t_6$, $t_7$, $t_8$ and $t_9$ and are fed with the five types of the input broadcasting waves. Each changeover switch $SW_1$, $SW_2$, $SW_3$, $SW_4$ selects one of the five types of the input broadcasting signals based on the changeover control signals. The selected broadcasting signals are supplied via diode $D_{11}$ and a control pulse trap circuit 62 to the distribution output terminals $t_6$, $t_7$, $t_8$ and $t_9$.

The distribution output terminals $t_6$, $t_7$, $t_8$ and $t_9$ are connected via coils $L_{11}$ and diodes $D_{12}$ to a regulator 63 which is adapted for supplying a constant voltage to a control pulse detection circuit 64, a micro-computer 65 and to a reception level indicator 74. The distribution output terminals $t_6$, $t_7$, $t_8$ and $t_9$ are connected via coils $L_{11}$ to control pulse detection circuit 64 which detects the control pulses transmitted thereto to output the detected control pulses to micro-computer 65.

The micro-computer 65 decodes the control pulses and outputs changeover control signals to the first to fourth changeover switches $SW_1$, $SW_2$, $SW_3$, $SW_4$ associated with the distribution output terminals $t_6$, $t_7$, $t_8$ and $t_9$ supplied with the selection information on the basis of the decoded selection information. On the other hand, the control pulses from micro-computer 65 are also supplied to a reception level indicator 74 for displaying the reception levels of the BS, $CS_1$ and $CS_2$ broadcasting waves.

One of the four BS/CS receivers 70 to 73, such as, for example, 70 has its power source switch turned on and the BS broadcasting is selected by broadcasting selection switch. An output of the converter power source is then issued over signal cable 66 and the control pulse is outputted by being superposed on the power source output. The control pulse is a digital signal and protected against voltage fluctuations so that it is transmitted reliably.

The regulator 63 supplies the outputs of the converter power source to control pulse detection circuit 64, micro-computer 65 and to reception level indicator 74 and the control pulse is entered to micro-computer 65 from control pulse detection circuit 64. Micro-computer 65 decodes the control pulse to output a control signal to first changeover switch $SW_1$.

The first changeover switch $SW_1$ selects the terminal for BS broadcasting and the output of the converter power source is supplied by the first changeover switch $SW_1$ to BS converter 54 over signal cable 55. The BS converter 54 is driven by this output for outputting BS broadcasting signals. The output BS broadcasting signals are transmitted over signal cable 55 in the inside of the changeover distributor 50 so as to be supplied to first distribution output terminal $t_6$ via first changeover switch $SW_1$. Thus the BS broadcasting signals are outputted over signal cable 66 to BS/CS receiver 70.

A data packet may be formed by adding the format of the reception level signals, indicating the reception level of the satellite broadcasting waves formed in dependence upon the AGC voltage of the BS/CS receiver 70 and the header information, to the format of the changeover control signals supplied to the changeover switches $SW_1$, $SW_2$, $SW_3$, $SW_4$ of the changeover distributor 50. The reception level signals of the control signals having this data packet are decoded by microcomputer 65 and supplied to reception level indicator so as to be displayed as the reception level of the BS broadcasting waves.

According to the above-described second embodiment of the satellite broadcasting reception system of the present invention, the control signal made up of the changeover control signal transmitted from the receiver over the signal cable and the reception level signal is used as a changeover control signal for selecting the broadcasting signals and as a reception level signal for displaying the reception level of the broadcast electromagnetic waves. By providing the reception level indicator indicating the reception level in the vicinity of the changeover distributor along with the changeover distributor, the satellite antenna may be adjusted while the operator views the reception display level, whereby the length of a number of signal cables interconnecting the satellite antenna and the changeover distributor may be diminished.

What is claimed is:

1. A satellite broadcasting reception system comprising:
   a satellite antenna for receiving electromagnetic waves,
   a signal cable for transmitting signals produced upon reception of the electromagnetic waves by said satellite antenna,
   a receiver for receiving the signals transmitted over said signal cable, and
   a reception level indicator connected to said signal cable for indicating a reception level of the electromagnetic waves on the basis of a control signal transmitted from said receiver over said signal cable, wherein said control signal comprises a signal modulating voice sampling clocks as a carrier.

2. The satellite broadcasting reception system as defined in claim 1 wherein said reception level indicator is mounted in the vicinity of the satellite antenna.

3. The satellite broadcasting reception system as defined in claim 1 wherein said receiver generates a carrier wave for said control signal without employing an oscillator.

4. The satellite broadcasting reception system as defined in claim 1 wherein the electromagnetic waves are broadcast by a broadcasting satellite.

5. The satellite broadcasting reception system as defined in claim 1 wherein the electromagnetic waves are broadcast by a communication satellite.

6. A satellite broadcasting reception system comprising:
   plural satellite antennas,
   a changeover distributor for switching among plural broadcasting signals obtained from plural electromagnetic waves received from said plural satellite antennas,
   plural signal cables for respectively transmitting plural broadcasting signals produced upon reception of the plural electromagnetic waves by said plural satellite antennas,
   plural receivers connected respectively to said plural signal cables for receiving the plural signals transmitted over said plural signal cables and for respectively producing plural control signals transmitted back over said plural signal cables, wherein each said plural control signal comprises a signal modulating voice sampling clocks as a carrier;
   microcomputer means connected to said plural signal cables for decoding said control signals and producing plural changeover signals fed to said control changeover distributor; and
   a reception level indicator connected to said microcomputer means for extracting a reception level signal from the plural control signals produced by said plural receivers and fed to said microcomputer means for indicating the reception levels of said broadcasting signals.

7. The satellite broadcasting reception system as defined in claim 6 wherein the electromagnetic waves are broadcast by broadcasting satellite or communication satellite.

* * * * *